United States Patent [19]

Cooper

[11] Patent Number: 5,181,043
[45] Date of Patent: Jan. 19, 1993

[54] PASSIVE REPEATER FOR CELLULAR PHONES

[75] Inventor: Gershon N. Cooper, Encino, Calif.

[73] Assignee: Alliance Research Corporation, Chatsworth, Calif.

[21] Appl. No.: 812,872

[22] Filed: Dec. 20, 1991

Related U.S. Application Data

[63] Continuation of Ser. No. 527,181, May 22, 1990, abandoned.

[51] Int. Cl.[5] .................................. H01Q 1/32
[52] U.S. Cl. .............................. 343/713; 343/715
[58] Field of Search .......................... 343/713, 715

[56] References Cited

U.S. PATENT DOCUMENTS

| | | |
|---|---|---|
| 3,945,014 | 3/1976 | Kunert et al. . |
| 4,089,817 | 5/1978 | Kirkendall . |
| 4,160,977 | 7/1979 | Davis . |
| 4,658,259 | 4/1987 | Blaese . |
| 4,710,775 | 12/1987 | Coe . |
| 4,764,773 | 8/1988 | Larsen et al. . |
| 4,779,098 | 10/1988 | Blaese .................. 343/715 |
| 4,789,869 | 12/1988 | Aslan . |
| 4,794,319 | 12/1988 | Shimazaki ............... 343/715 |
| 4,804,969 | 2/1989 | Blaese .................... 343/715 |
| 4,857,939 | 8/1989 | Shimazaki . |
| 4,879,570 | 11/1989 | Takizawa et al. . |
| 4,931,806 | 6/1990 | Wunderlich . |
| 5,099,252 | 3/1992 | Bryant et al. ............ 343/713 |

FOREIGN PATENT DOCUMENTS

| | | |
|---|---|---|
| 0431640 | 6/1991 | European Pat. Off. . |
| 3537107 | 4/1987 | Fed. Rep. of Germany ...... 455/272 |
| 308421 | 12/1988 | Japan .................... 455/272 |
| 36128 | 2/1989 | Japan .................... 455/272 |
| 1334356 | 10/1973 | United Kingdom . |

Primary Examiner—Michael C. Wimer
Attorney, Agent, or Firm—Marvin H. Kleinberg

[57] ABSTRACT

A mast radiator is affixed to a glass or other non conductive exterior panel of a vehicle and is provided with a dipole element and one or more parasitic elements to exchange signals, with gain, between the mast and the antenna of a portable cellular telephone unit within the vehicle. In the preferred embodiment, a separate base unit with parasitic elements is mounted on the same glass panel on the opposite surface and opposite the base of the mast radiator.

8 Claims, 4 Drawing Sheets

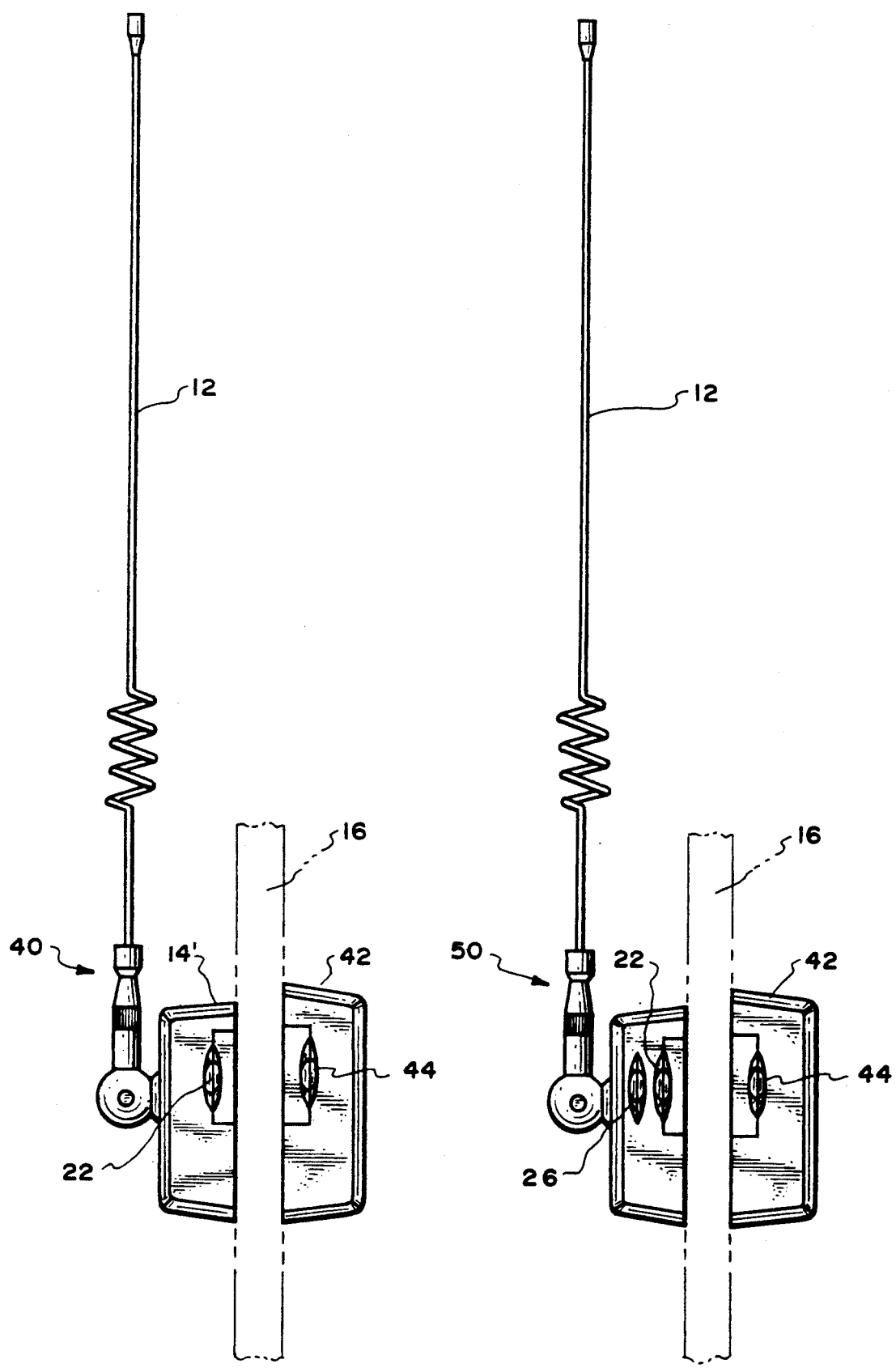

PASSIVE REPEATER FOR CELLULAR PHONES

This is a continuation of copending application Ser. No. 07/527,181 filed on May 22, 1990 now abandoned.

The present invention relates to communications systems, and more particularly, to an improved combination for sending a radio transmission between a fixed antenna on the outside of a structure and a transceiver within the structure.

Radio transmission and reception is difficult when a transceiver unit is located wholly within a structure that can act as a shield against radiation. For example, the interior of a motor vehicle may be isolated from radio signals that originate outside of the vehicle. Further, the transmission of radio signals from a transmitter which is located inside the vehicle may be blocked, as well.

BACKGROUND OF THE INVENTION

Transceivers which are located inside vehicles are commonly connected to an antenna which is mounted on the exterior of the vehicle by means of a coaxial cable or other wire link. Frequently, the radiating and receiving element of the antenna, which is located on the exterior of the vehicle, is capacitively coupled to the coaxial cable termination through a glass window of the vehicle, thereby eliminating the necessity of drilling holes in the body of the vehicle.

The increasingly common use of cellular telephones operating in the 800 to 1000 MHz frequency range in motor vehicles has promoted the use of such through the glass antenna units since the cellular telephone preferably utilizes an antenna whose mast extends above the roof line of the vehicle for optimum reception and transmission. Through the glass antennas are easily mounted near the top of the rear window and the antenna mast can extend vertically above the roof line.

Several types of cellular telephones are common today. A permanently installed car telephone has a direct power connection to the vehicle electrical supply and has a coaxial link to the installed antenna. A so called "transportable" cellular telephone is a similar telephone unit which includes a self contained power supply and a movable antenna so that it can be carried in a brief case. The permanent and transportable telephones are permitted to have a maximum transmitted power of 3.0 watts, which generally mandates the use of a coaxial transmission line to an antenna.

In recent years, a smaller, compact and lightweight cellular telephone has been developed which can be hand held. This hand held or "portable" telephone, which usually has an integral antenna as a part of the unit, is permitted a radiated power level of only 0.6 watts. Such devices can be quite small and can fit in one's pocket. When used in an open space, the portable can easily communicate with a "cell" of the cellular system. However, difficulties can be encountered if one wishes to use a portable when inside a vehicle since the metal body of the vehicle acts as a shield to both incoming and outgoing signals.

These difficulties can be overcome if the portable unit can be connected to an exterior antenna or if the portable can be operated through an open window in the vehicle and the metallic mass of the vehicle doesn't affect the receiving or radiation patterns of the antenna. One approach has been marketed under the trademark LARSEN® ANTENNAS by Larsen Electronics, Inc., of Vancouver, Wa., Model KGB-825. This unit is described as a "passive repeater antenna" which passes signals to and from the externally mounted gain antenna elements.

Such an approach, however, fails to consider the low power available from the portable phone unit and the fact that the radiation pattern from the portable phone antenna is omnidirectional. This generally results in a very small fraction of the radiated power reaching the "repeater" and the external antenna unit. Similarly, the energy received by the external antenna is transferred to the "repeater" and omnidirectionally radiated within the vehicle. Only a small fraction of the received is signal is acquired by the portable phone antenna. Further, the external antenna and the internal dipole repeater are coupled capacitively, through the glass window, thereby resulting in some signal loss.

BRIEF SUMMARY OF THE INVENTION

According to the present invention, a directional passive repeater includes a dipole, which, in a preferred embodiment may be $\frac{1}{2}$ wave, that is attached and matched to the external radiating/receiving antenna mast which is adhesively mounted to a window of a vehicle. Preferably, the rear window is utilized since it does not create any significant visual obstruction to the driver's field of view It is, of course, possible to mount the antenna to the front windshield or to any of the fixed glass side windows.

In the simplest embodiment of the present invention, the dipole is made of a sheet material to increase the surface area that faces the interior of the vehicle. This increases the gain in a direction orthogonal to the surface by about 2 dB over conventional round wires. It is then possible for a portable unit on the interior of the vehicle to "see" the externally mounted dipole and communicate with it both in the sending and receiving modes.

In order to create more "gain" in the direction of the portable phone unit and its antenna, one or more parasitic elements may be added. For example, a "reflector" radial, that is approximately 0.58 wavelength, is spaced at least 1/10 wavelength (or multiples thereof) away from the dipole in a direction that is substantially orthogonal to the axis of the mast and the axis of the dipole and which creates gain for signals being exchanged between the dipole and the antenna of the portable unit. This reflector dipole can also be mounted on the exterior of the vehicle and is in communication with the portable unit by radiation through the glass.

In another embodiment, a second parasitic radial, or "director" that is at least 0.45 wavelength, is mounted on the interior of the vehicle, on the opposing surface of the glass and at least 1/10 wavelength from the dipole. In yet other embodiments, additional parasitic elements acting as directors and/or reflectors can be added to increase the directionality of the array and to increase the gain, as well, with respect to signals between the repeater and the antenna of the portable unit. In adding additional elements, it is important that each element be spaced at least 1/10 wavelength from the next adjacent element.

At the radio frequencies of operation, the glass has no shielding effect and a capacitative coupling through the glass is unnecessary. The resulting combination according to the present invention is a passive array which can be highly directional and can effectively impart "gain" to signals which are passed between the portable phone antenna and the external mast.

In alternative embodiments, additional parasitic elements can be provided inside or outside of the vehicle to improve the gain and directionality of the array. Because there is no capacitative coupling through the glass, there are no "coupling" losses.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIG. 5 is a side view of an alternative embodiment including a parasitic element on each side of the vehicle glass;

FIG. 6 is a side view of a preferred embodiment with two parasitic elements on one side of the glass and one on the other.

DETAILED DESCRIPTION OF THE DRAWINGS

Figures 1, 7:
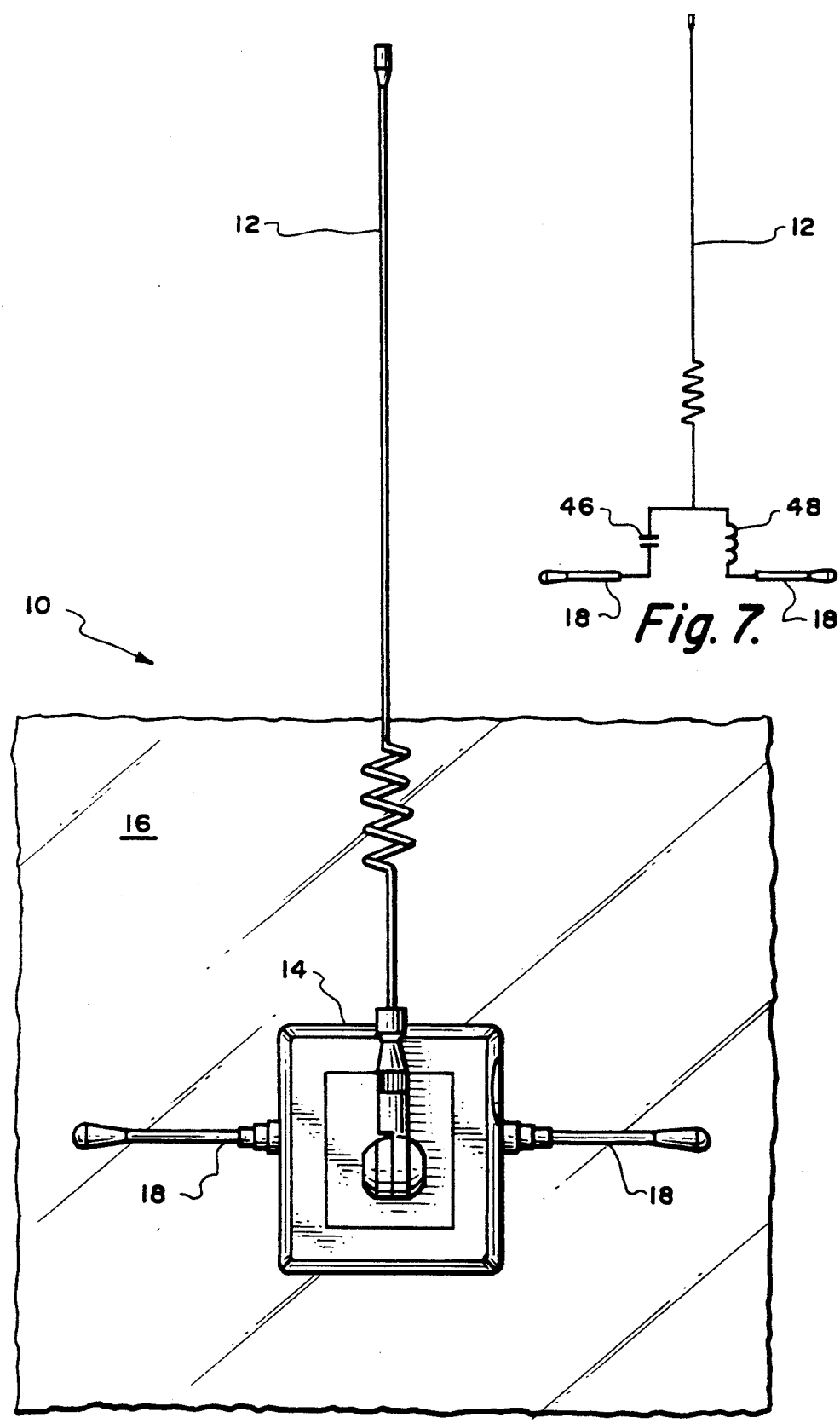
FIG. 1 is a front view of a repeater according to the present invention.
FIG. 7 is an electrical diagram of the repeater of the present invention.

Turning first to FIG. 1, there is shown a cellular repeater 10 according to a primitive embodiment of the present invention. As shown, the repeater 10 includes a mast radiator 12 and a base 14 which is adhesively affixed to the exterior of a glass window element 16 of a vehicle. The glass window element 16 is preferably the rear window of the vehicle, but can be any of the non conductive panels of the vehicle. While the rear window or back light is the mounting place of choice, the side windows or the front windshield of the vehicle can serve, as well.

Embedded in the base 14 and extending substantially (but not necessarily) at right angles to the axis of the mast radiator 12 are a pair of quarter wave radials 18 that are connected to serve as a ½ wave dipole. The radials 18 are coupled to the mast radiator 12 and aid in the passive repeater function with respect to signals received by the mast radiator 12 and with respect to signals that are received from a portable transmitter (not shown) in the near vicinity.

Figures 2, 3:
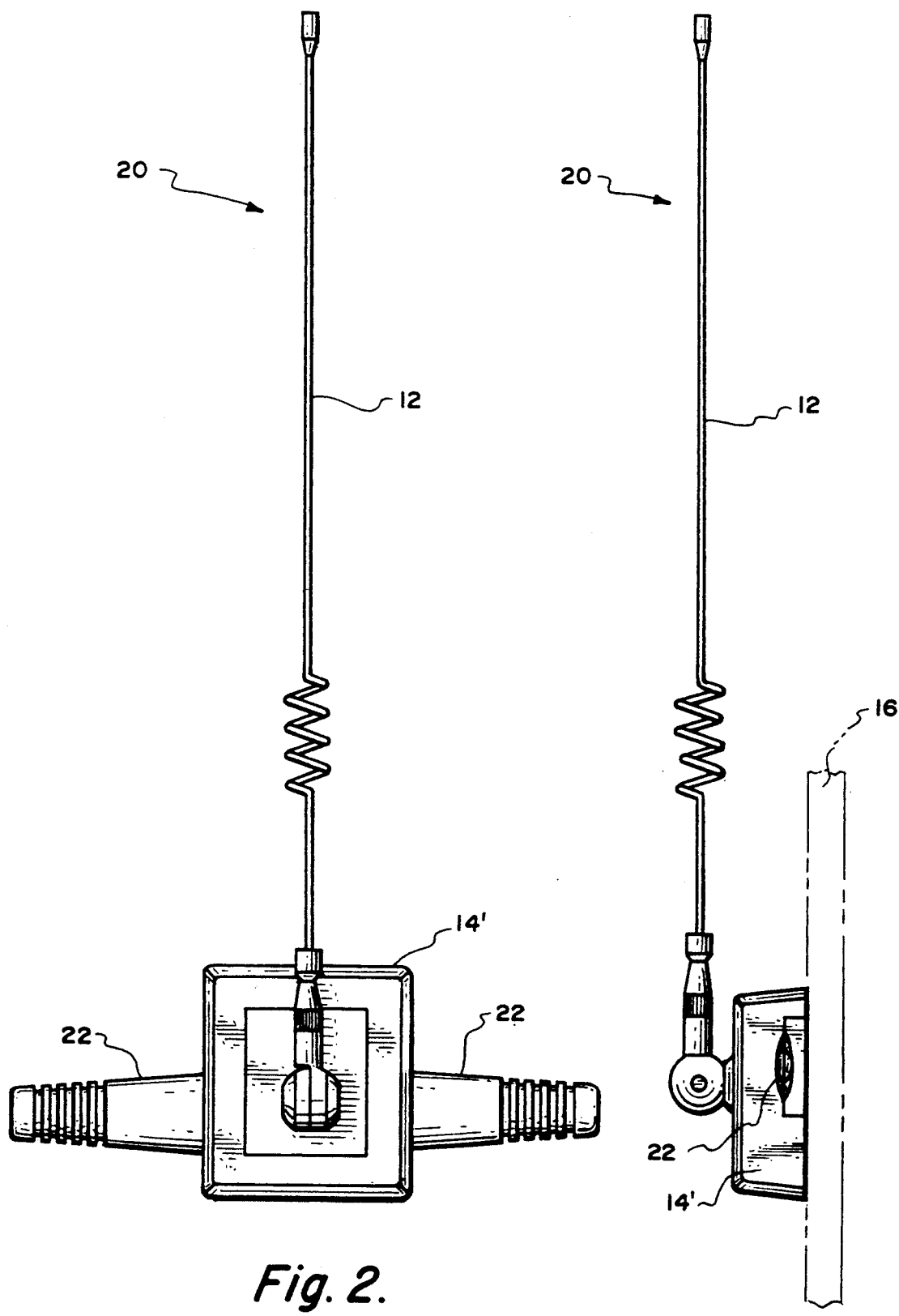
FIG. 2 is a front view of an alternative repeater.
FIG. 3 is a side view of the repeater of FIG. 2.

To improve the efficiency of the radials 18, a modified antenna 20 is shown in FIGS. 2 and 3. Rather than using a small diameter round wire as the radial element, flat elongated plates 22 in the base 14' extend approximately one quarter wave from the mast radiator 12 and serve as the dipole. As seen in FIG. 3, the plates 22, which are functionally identical to the radials 18, are orthogonally displaced from the mast radiator 12 in a direction at right angles to the mast radiator 12 axis. Using the plates 22 permits slightly higher gain in the horizontal plane and thus better communication between the portable telephone 24 antenna on the interior of the vehicle and the dipole plates 22 which are mounted on the exterior of the vehicle.

Figure 4:
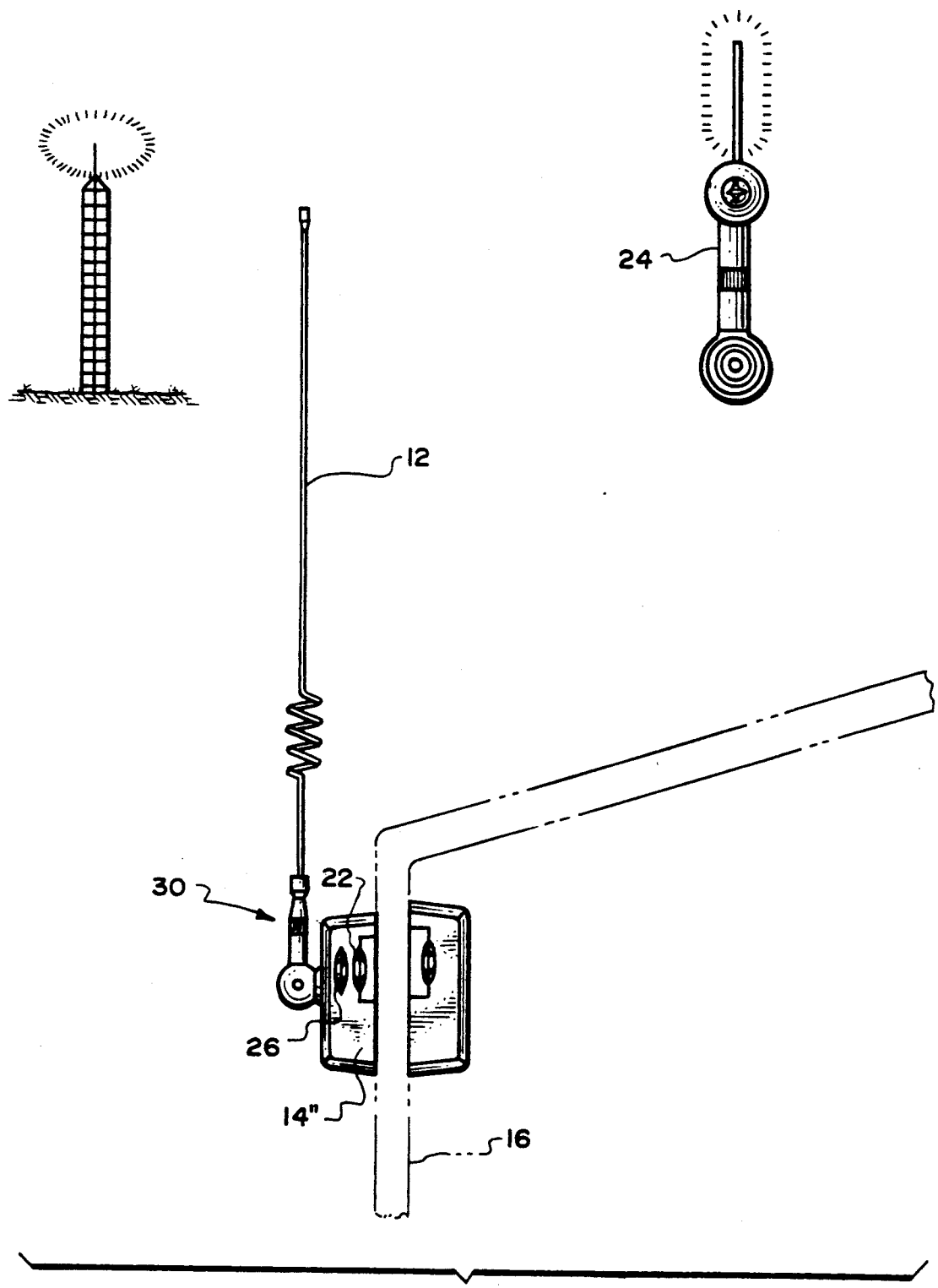
FIG. 4 is a diagram of a passive repeater array according to the present invention.

To further improve the gain, an additional parasitic element can be added to the base to create another alternative repeater 30 as is shown in FIG. 4. A base 14" is modified to include two pairs of elements. A first dipole, made up of one quarter wave segments 22, is positioned adjacent the glass 16 while a second pair of elements 26 are spaced at least 1/10 wavelength from the dipole pair and function as a reflector with a sensitive gain axis in the direction toward the front of the vehicle where the portable unit is most likely to be found.

In the embodiment of FIG. 5, a similar result is achieved in repeater 40 by utilizing a parasitic element on the interior of the vehicle. As shown, the base 14' containing the quarter wave segments 22 is affixed to the exterior of a glass plate 16 and an interior base 42 has a similar pair of parasitic elements 44 which function as a director. The combination is then more sensitive to electromagnetic radiation in the horizontal plane along a line generally parallel to the vehicular axis when the base 14, is affixed to the rear window. Such radiation readily passes through glass without the need for a capacitative coupling.

Generally, the director element 44 should be less than one quarter wave length and should be spaced apart from the dipole segments 22 by at least 1/10 wavelength, which includes the thickness of the glass 16.

A preferred embodiment of the invention has been shown in FIG. 6. Here, the alternative antenna 30 of FIG. 4 is combined with the interior base 42 of FIG. 5 to form a repeater combination 50 that includes dipole segments 22, reflector elements 26 and, on the interior base 42, director elements 44. This arrangement more nearly approximates a passive dipole array that is highly directional and which exhibits considerable gain along the sensitive axis which is orthogonal to the parasitic elements.

As in the other embodiments, the spacing between adjacent elements is at least 1/10 wavelength and the effective length of the director is less than ½ wavelength while the reflector is more than ½ wavelength. In one experimental model, the director was set at 0.45 wave length while the radiator was set at 0.58 wave length.

FIG. 7 is an electrical diagram of the dipole 18 of FIG. 1 connected to the radiating mast 12. As shown, the connection to one arm of the dipole 18 is through a capacitive element 46 and through an inductive element 48 to the other arm of the dipole 18. The impedance values are selected or tuned for optimum electrical coupling between the radiator mast 12 and the dipole 18 at the frequencies of interest. Since the dipole elements of the other embodiments are electrically equivalent to the dipole of FIG. 1, the electrical interconnection would be similar.

Thus there has been shown a passive antenna repeater for a portable cellular telephone which is to be used in the interior of a vehicle. The repeater unit in its simplest embodiment includes a passive dipole which is coupled to a mast radiator that has unobstructed communication with a "cell". The portable telephone is operated within the vehicle which would otherwise effectively shield the telephone antenna from the "cell".

As a result, the telephone antenna and the dipole are now in direct, line of sight, electromagnetic radiant communication for transmission and reception of electrical signals. The signals received by the passive dipole are radiated from the radiator mast and the signals received by the radiator mast are radiated from the dipole to the interior telephone antenna at power levels which are sufficiently low to pose no human health hazard.

In alternative embodiments, additional parasitic elements are added, either to the externally mounted device or to an internally mounted device which is placed on the inner surface of the vehicle glass opposite the externally mounted device.

Other modifications and alterations will appear to those skilled in the art and, accordingly, the scope of the invention should be limited only by the scope of the claims appended hereto.

What is claimed as new is:

1. A passive repeater assembly for use with a transceiver located within a shielding environment that has areas that are transparent to wireless electromagnetic radiation, comprising in combination:
    a) a first antenna, including a radiator having an axis, said first antenna being mounted to the exterior of the shielding environment in one of the radiation transparent areas thereof;
    b) a second antenna connected to said first antenna and orthogonally displaced therefrom mounted exterior to the shielding environment, and in electromagnetic radiant transmission and reception communication with the transceiver; and
    c) means for electrically coupling said second antenna with said first antenna radiator,
    whereby a transceiver antenna directly radiates energy within the shielding environment without a wire link to said second antenna, and by means of said radiator, the transceiver communicates with remote transmitters and receivers that are in radiant energy communication with said radiator.

2. A repeater assembly as in claim 1, further including a parasitic element mounted on the interior of the shielding environment in the transparent area thereof opposite and adjacent said second antenna, said parasitic element being spaced at least 1/10 wavelength from said second antenna and arranged to be substantially parallel thereto for enhancing radiant energy transmission and reception in a selected direction,
    whereby a transceiver within the shielding environment is solely in radiant energy communication with said second antenna and, by means of said first antenna radiator, communicates with remote transmitters and receivers that are in radiant energy communication with said radiator and whereby gain is imparted to signals transmitted in the selected direction between the repeater assembly and the transceiver within the shielded environment.

3. A repeater assembly as in claim 1, further including a parasitic element adjacent to said first antenna at the base thereof substantially parallel to said second antenna for enhancing communication between the transceiver and said second antenna in a selected direction whereby a transceiver within the shielding environment is solely in radiant energy communication with said second antenna, and by means of said first antenna radiator, communicates with remote transmitters and receivers that are in radiant energy communication with said radiator and whereby gain is imparted to signals transmitted in the selected direction between the repeater assembly and the transceiver within the shielded environment.

4. A repeater assembly as in claim 3, further including a second parasitic element mounted on the interior of the shielding environment in the transparent area thereof adjacent and opposite said second antenna, said second parasitic element being spaced at least 1/10 wavelength from said second antenna and arranged to be substantially parallel thereto for enhancing radiant energy transmission and reception in a selected direction, whereby gain is imparted to signals transmitted in the selected direction between the repeater assembly and the transceiver within the shielded environment.

5. A repeater assembly for use with a transceiver located within a shielding environment having areas that are transparent to electromagnetic radiation, comprising in combination:
    a) a first antenna, including a mast element having an axis, said antenna being adapted to radiate and receive cellular telephone signals;
    b) a first base member coupled to said antenna and adapted to be mounted to the exterior of the shielding environment in a radiation transparent area thereof; and
    c) a second antenna mounted exterior of the shielding environment on said first base member and electrically coupled to said first antenna, and second antenna extending in a direction that is not parallel to the mast element axis for maximizing transmission and reception in a plane that intersects said mast element axis and adapted to transmit and receive radiated signals to and from the transceiver within the shielded environment without a wire connection therebetween;
    whereby the transceiver within the shielding environment is in radiant energy communication with said second antenna and, by means of said first antenna mast element, the transceiver communicates with remote transmitters and receivers that are in radiant energy communication with said first antenna.

6. A repeater assembly as in claim 5, further including a parasitic element mounted in a second base member that is adapted to be installed on the interior of the shielding environment in the transparent area thereof adjacent and opposite said first base member, said parasitic element being spaced at least 1/10 wavelength from said second antenna and arranged to be substantially parallel thereto for enhancing transmission and reception in a selected direction, whereby the presence of said parasitic element imparts gain to signals transmitted and received in the selected direction between the repeater assembly and the transceiver within the shielded environment.

7. A repeated assembly as in claim 5, further including a parasitic element in said first base member substantially parallel to said second antenna for imparting gain to radiant energy transmission and reception in a selected direction whereby signals are exchanged in the selected direction between the repeater assembly and a transceiver within the shielded environment.

8. A repeater element as in claim 7, further including a second parasitic element mounted in a second base member adapted to be mounted on the interior of the shielding environment in the transparent area thereof adjacent said first base member, said second parasitic element being spaced at least 1/10 wavelength from said second antenna and arranged to be substantially parallel thereto for enhancing gain and directionality of radiant energy transmission and reception between the repeater assembly and the transceiver, whereby gain is imparted to signals transmitted in the selected direction between the repeater assembly and the transceiver within the shielded environment.

* * * * *